United States Patent
Hirata et al.

(10) Patent No.: US 7,573,686 B2
(45) Date of Patent: Aug. 11, 2009

(54) THIN-FILM MAGNETIC HEAD INCLUDING LOW-RESISTANCE TMR ELEMENT

(75) Inventors: Kei Hirata, Tokyo (JP); Satoshi Miura, Tokyo (JP); Naoki Ota, Tokyo (JP)

(73) Assignee: TDK Corporation, Tokyo (JP)

(*) Notice: Subject to any disclaimer, the term of this patent is extended or adjusted under 35 U.S.C. 154(b) by 403 days.

(21) Appl. No.: 11/474,487

(22) Filed: Jun. 26, 2006

(65) Prior Publication Data

US 2007/0297099 A1    Dec. 27, 2007

(51) Int. Cl.
    G11B 5/39    (2006.01)
(52) U.S. Cl. .................................. 360/324.2
(58) Field of Classification Search .............. 360/324.2
    See application file for complete search history.

(56) References Cited

U.S. PATENT DOCUMENTS

| 5,416,353 | A | 5/1995 | Kamiguchi et al. |
| 6,452,204 | B1 | 9/2002 | Ishiwata et al. |
| 2002/0164828 | A1 | 11/2002 | Ishiwata et al. |
| 2003/0030945 | A1* | 2/2003 | Heinonen et al. ......... 360/324.2 |
| 2004/0091744 | A1* | 5/2004 | Carey et al. .................. 428/693 |
| 2006/0060989 | A1 | 3/2006 | Morise et al. |
| 2006/0176619 | A1* | 8/2006 | Gao et al. ................. 360/324.2 |
| 2006/0281258 | A1* | 12/2006 | Dieny et al. ................. 438/264 |

FOREIGN PATENT DOCUMENTS

| JP | A 6-97531 | 4/1994 |
| JP | A 07-178866 | 7/1995 |
| JP | A 08-050815 | 2/1996 |
| JP | A 11-177161 | 7/1999 |
| JP | A 11-204854 | 7/1999 |
| JP | A 2000-231706 | 8/2000 |
| JP | A 2001-084532 | 3/2001 |
| JP | A 2001-094172 | 4/2001 |
| JP | A 2001-185418 | 7/2001 |
| JP | A 2002-084014 | 3/2002 |
| JP | A 2002-217471 | 8/2002 |
| JP | A 2006-86476 | 3/2006 |

* cited by examiner

Primary Examiner—Craig A Renner
(74) Attorney, Agent, or Firm—Oliff & Berridge, PLC

(57) ABSTRACT

An MR element comprises: a tunnel barrier layer having two surfaces facing toward opposite directions; a free layer disposed adjacent to one of the surfaces of the tunnel barrier layer and having a direction of magnetization that changes in response to a signal magnetic field; and a pinned layer disposed adjacent to the other of the surfaces of the tunnel barrier layer and having a fixed direction of magnetization. The tunnel barrier layer is made of a material containing an oxide semiconductor such as ZnO. The MR element has a resistance-area product that falls within a range of 0.3 to 2.0 $\Omega\text{-}\mu m^2$ inclusive.

6 Claims, 11 Drawing Sheets

THIN-FILM MAGNETIC HEAD INCLUDING LOW-RESISTANCE TMR ELEMENT

BACKGROUND OF THE INVENTION

1. Field of the Invention

The present invention relates to a thin-film magnetic head incorporating a magnetoresistive element utilizing a tunnel magnetoresistive effect, and to a head gimbal assembly, a head arm assembly, and a magnetic disk drive each of which incorporates the thin-film magnetic head.

2. Description of the Related Art

Performance improvements in thin-film magnetic heads have been sought as areal recording density of magnetic disk drives has increased. A widely used type of thin-film magnetic head is a composite thin-film magnetic head that has a structure in which a write (recording) head having an induction-type electromagnetic transducer for writing and a read (reproducing) head having a magnetoresistive (MR) element for reading are stacked on a substrate.

MR elements include: anisotropic magnetoresistive (AMR) elements utilizing an anisotropic magnetoresistive effect; giant magnetoresistive (GMR) elements utilizing a giant magnetoresistive effect; and tunnel magnetoresistive (TMR) elements utilizing a tunnel magnetoresistive effect.

It is required that the characteristics of a read head include high sensitivity and high output capability. GMR heads incorporating spin-valve GMR elements have been mass-produced as read heads that satisfy such requirements. Recently, developments in read heads using TMR elements have been sought to conform to further improvements in areal recording density.

Typically, a TMR element incorporates: a tunnel barrier layer having two surfaces facing toward opposite directions; a free layer disposed adjacent to one of the surfaces of the tunnel barrier layer; a pinned layer disposed adjacent to the other of the surfaces of the tunnel barrier layer; and an antiferromagnetic layer disposed adjacent to one of the surfaces of the pinned layer farther from the tunnel barrier layer. The tunnel barrier layer is a nonmagnetic layer that allows electrons to pass therethrough while the electrons maintain spins by means of the tunnel effect. The free layer is a layer in which the direction of magnetization changes in response to a signal magnetic field. The pinned layer is a ferromagnetic layer in which the direction of magnetization is fixed. The antiferromagnetic layer is a layer that fixes the direction of magnetization in the pinned layer by means of exchange coupling with the pinned layer.

In the TMR element the direction of magnetization of the free layer changes in response to the signal field sent from a recording medium. The relative angle between the direction of magnetization of the free layer and the direction of magnetization of the pinned layer thereby changes. If the relative angle changes, the probability of electrons passing through the tunnel barrier layer while maintaining spins changes. As a result, the resistance of the TMR element changes. Data stored on the recording medium is read by detecting the changes in resistance of the TMR element. It is expected for the TMR element to obtain a magnetoresistance change ratio (hereinafter referred to as MR ratio), that is, a ratio of magnetoresistance change with respect to the resistance, greater than an MR ratio obtained with a spin-valve GMR element.

Typically, the tunnel barrier layer is an insulating layer made of an insulating material such as aluminum oxide or magnesium oxide.

Japanese Published Patent Application 6-97531 discloses a magnetoresistive element having a structure in which a semiconductor layer is sandwiched between two magnetic layers. In the magnetoresistive element a Schottky barrier between the semiconductor layer and each of the magnetic layers is used as a tunnel barrier. This publication discloses that it is possible that the semiconductor layer has a thickness greater than the thickness of a tunnel barrier layer of a TMR element in which the tunnel barrier layer is made of an insulating layer.

Japanese Published Patent Application 2001-94172 discloses a spin conduction element having a structure in which a tunnel barrier layer made of an insulator or a semiconductor is sandwiched between a ferromagnetic electrode and another electrode made of a paramagnetic metal, a ferromagnetic metal or a semiconductor. This publication lists materials of the tunnel barrier layer that make it possible to obtain a tunnel current having a great spin polarization.

Japanese Published Patent Application 2002-84014 discloses a magnetoresistive element having a structure in which a second layer made of a nonmagnetic insulating film is sandwiched between a first layer made of a ferromagnetic metal thin film and a third layer made of a ferromagnetic metal thin film. This magnetoresistive element is designed such that the spin polarization of the second layer is one tenth or smaller of the spin polarization of each of the first and third layers. A ZnOx (x=0.95 to 1.05) thin film as an insulating film is used as the second layer. This publication discloses that if such a second layer is used, it is possible to improve the MR ratio of the magnetoresistive element and to improve performance of the magnetoresistive element such as detection sensitivity.

Japanese Published Patent Application 2006-86476 discloses a magnetic write element comprising: a free layer in which the direction of magnetization changes due to the function of spin-polarized electrons; a pinned layer in which the direction of magnetization is fixed; and an intermediate layer made of a nonmagnetic material and provided between the pinned layer and the free layer. This publication lists a nonmagnetic metal material, a nonmagnetic semiconductor material and an insulating material as the material of the intermediate layer. The magnetic write element is designed so that the direction of magnetization of the free layer is changed by feeding spin-polarized electrons to the free layer.

When a TMR element is used for a read head, a reduction in resistance of the TMR element is required. The reason will now be described. For a magnetic disk drive, improvements in recording density and data transfer rate are required. An excellent high frequency response is required for the read head, accordingly. However, if the resistance of the TMR element is high, stray capacitance produced in the TMR element and in circuits connected thereto is increased, and the high frequency response of the read head is thereby degraded. A reduction in resistance of the TMR element is therefore required.

Typically, it is effective to reduce the thickness of the tunnel barrier layer for reducing the resistance of the TMR element. However, if the tunnel barrier layer is made too thin, magnetic coupling is established between the free layer and the pinned layer, which results in degradation of characteristics of the TMR element such as an increase in noise and a reduction in MR ratio.

Furthermore, if the TMR element is increased in size, the resistance thereof is reduced. However, an increase in size of the TMR element is against the demand for improving the recording density.

A variety of types of magnetoresistive elements having features in the layer corresponding to the tunnel barrier layer of the TMR element have been proposed, as disclosed in Japanese Published Patent Application 6-97531, Japanese Published Patent Application 2001-94172, Japanese Published Patent Application 2002-84014, and Japanese Published Patent Application 2006-86476. However, a reduction in resistance of the magnetoresistive element is considered in none of these publications.

OBJECT AND SUMMARY OF THE INVENTION

It is an object of the invention to provide a thin-film magnetic head incorporating a magnetoresistive element utilizing the tunnel magnetoresistive effect, the thin-film magnetic head being capable of achieving a reduction in resistance of the magnetoresistive element without degrading characteristics of the magnetoresistive element, and to provide a head gimbal assembly, a head arm assembly, and a magnetic disk drive each of which incorporates the thin-film magnetic head.

A thin-film magnetic head of the invention comprises: a medium facing surface that faces toward a recording medium; and a magnetoresistive element for detecting a signal magnetic field sent from the recording medium. The magnetoresistive element incorporates: a tunnel barrier layer having two surfaces facing toward opposite directions; a free layer disposed adjacent to one of the surfaces of the tunnel barrier layer and having a direction of magnetization that changes in response to the signal magnetic field; and a pinned layer disposed adjacent to the other of the surfaces of the tunnel barrier layer and having a fixed direction of magnetization. The tunnel barrier layer is made of a material containing an oxide semiconductor. The magnetoresistive element has a resistance-area product that falls within a range of 0.3 to 2.0 $\Omega$-$\mu m^2$ inclusive.

According to the thin-film magnetic head of the invention, the tunnel barrier layer of the magnetoresistive element is made of a material containing an oxide semiconductor, and the magnetoresistive element has a resistance-area product that falls within a range of 0.3 to 2.0 $\Omega$-$\mu m^2$ inclusive. As a result, according to the invention, a reduction in resistance of the magnetoresistive element is achieved without making the tunnel barrier layer extremely thin.

In the thin-film magnetic head of the invention, the resistance-area product of the magnetoresistive element preferably falls within a range of 0.5 to 1.5 $\Omega$-$\mu m^2$ inclusive.

In the thin-film magnetic head of the invention, the tunnel barrier layer preferably has a thickness that falls within a range of 1 to 3 nm inclusive, more preferably a range of 1 to 2 nm inclusive, and still more preferably a range of 1.3 to 2 nm inclusive.

In the thin-film magnetic head of the invention, the oxide semiconductor may be zinc oxide. In the thin-film magnetic head of the invention, the tunnel barrier layer may be made of a material containing an additive in addition to the oxide semiconductor.

A head gimbal assembly of the invention comprises: a slider including the thin-film magnetic head of the invention and disposed to face toward a recording medium; and a suspension flexibly supporting the slider.

A head arm assembly of the invention comprises: a slider including the thin-film magnetic head of the invention and disposed to face toward a recording medium; a suspension flexibly supporting the slider; and an arm for making the slider travel across tracks of the recording medium, the suspension being attached to the arm.

A magnetic disk drive of the invention comprises: a slider including the thin-film magnetic head of the invention and disposed to face toward a recording medium that is driven to rotate; and an alignment device supporting the slider and aligning the slider with respect to the recording medium.

According to the thin-film magnetic head, the head gimbal assembly, the head arm assembly, or the magnetic disk drive of the invention, the tunnel barrier layer of the magnetoresistive element is made of a material containing an oxide semiconductor, and the magnetoresistive element has a resistance-area product that falls within a range of 0.3 to 2.0 $\Omega$-$\mu m^2$ inclusive. As a result, according to the invention, a reduction in resistance of the magnetoresistive element is achieved without making the tunnel barrier layer extremely thin. It is thereby possible to reduce the resistance of the magnetoresistive element without degrading characteristics of the magnetoresistive element.

Other and further objects, features and advantages of the invention will appear more fully from the following description.

DETAILED DESCRIPTION OF THE PREFERRED EMBODIMENT

Figure 2:
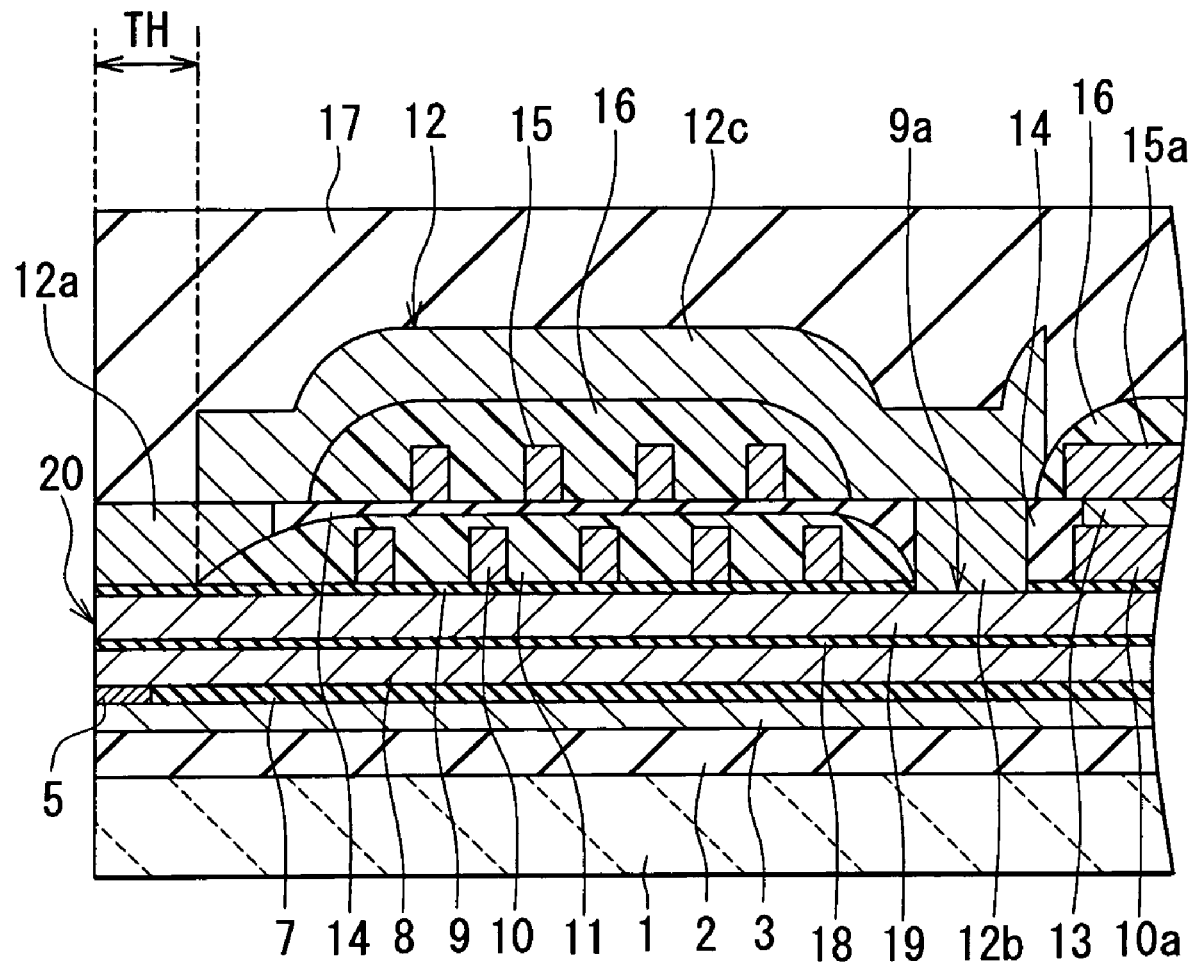
FIG. 2 is a cross-sectional view illustrating a cross section of a thin-film magnetic head of the embodiment of the invention orthogonal to the medium facing surface and a substrate.
Figure 3:
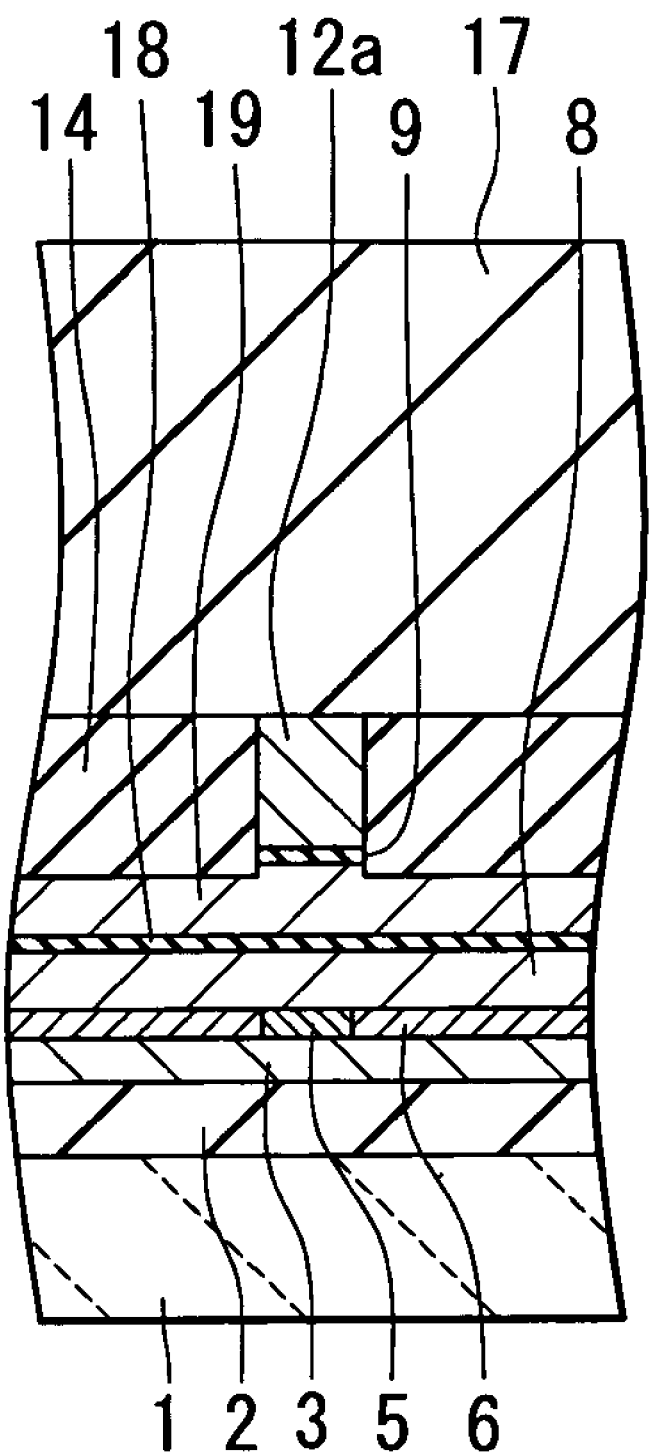
FIG. 3 is a cross-sectional view illustrating a cross section of a pole portion of the thin-film magnetic head of the embodiment of the invention parallel to the medium facing surface.

A preferred embodiment of the invention will now be described in detail with reference to the accompanying drawings. Reference is now made to FIG. 2 and FIG. 3 to describe the configuration of a thin-film magnetic head of the embodiment of the invention and an outline of a method of manufacturing the same. FIG. 2 is a cross-sectional view illustrating a cross section of the thin-film magnetic head orthogonal to a medium facing surface and a substrate. FIG. 3 is a cross-sectional view illustrating a cross section of a pole portion of the thin-film magnetic head parallel to the medium facing surface.

In the method of manufacturing the thin-film magnetic head of the embodiment, first, an insulating layer 2 made of an insulating material such as alumina ($Al_2O_3$) and having a thickness of 0.2 to 5 μm, for example, is formed by a method such as sputtering on a substrate 1 made of a ceramic such as aluminum oxide and titanium carbide ($Al_2O_3$—TiC). Next, a first shield layer 3 for a read head having a specific pattern and made of a magnetic material such as NiFe or FeAlSi is formed on the insulating layer 2 by a method such as plating. Next, although not shown, an insulating layer of alumina, for example, is formed over the entire surface. Next, the insulating layer is polished by chemical mechanical polishing (CMP), for example, so that the first shield layer 3 is exposed, and the top surfaces of the first shield layer 3 and the insulating layer are thereby flattened.

Next, an MR element 5 for reading, two bias field applying layers 6 to be located adjacent to the two sides of the MR element 5, and an insulating layer 7 to be disposed around the MR element 5 and the bias field applying layers 6 are formed on the first shield layer 3. The insulating layer 7 is made of an insulating material such as alumina.

Next, a second shield layer 8 for the read head is formed on the MR element 5, the bias field applying layers 6 and the insulating layer 7. The second shield layer 8 is made of a magnetic material and may be formed by plating or sputtering, for example. Next, a separating layer 18 made of a nonmagnetic material such as alumina is formed by sputtering, for example, on the second shield layer 8. Next, a bottom pole layer 19 provided for a write head and made of a magnetic material is formed on the separating layer 18 by plating or sputtering, for example. The magnetic material used for the second shield layer 8 and the bottom pole layer 19 is a soft magnetic material such as NiFe, CoFe, CoFeNi or FeN. Alternatively, a second shield layer that also functions as a bottom pole layer may be provided in place of the second shield layer 8, the separating layer 18 and the bottom pole layer 19.

Next, a write gap layer 9 made of a nonmagnetic material such as alumina and having a thickness of 50 to 300 nm, for example, is formed on the bottom pole layer 19 by a method such as sputtering. Next, to make a magnetic path, a portion of the write gap layer 9 is etched to form a contact hole 9a in a center portion of a thin-film coil described later.

Next, a first layer portion 10 of the thin-film coil made of copper (Cu), for example, and having a thickness of 2 to 3 μm, for example, is formed on the write gap layer 9. In FIG. 2 numeral 10a indicates a connecting portion of the first layer portion 10 connected to a second layer portion 15 of the thin-film coil described later. The first layer portion 10 is wound around the contact hole 9a.

Next, an insulating layer 11 having a specific pattern is formed to cover the first layer portion 10 of the thin-film coil and the write gap layer 9 disposed around the first layer portion 10. The insulating layer 11 is made of an organic insulating material that exhibits fluidity when heated, such as photoresist. Next, heat treatment is performed at a specific temperature to flatten the surface of the insulating layer 11. Through this heat treatment, each of the outer and inner edge portions of the insulating layer 11 is made to have a shape of rounded sloped surface.

Next, a track width defining layer 12a of a top pole layer 12 made of a magnetic material for the write head is formed on regions of the write gap layer 9 and the insulating layer 11, the regions extending from a sloped portion of the insulating layer 11 closer to a medium facing surface 20 described later toward the medium facing surface 20. The top pole layer 12 is made up of the track width defining layer 12a, and a coupling portion layer 12b and a yoke portion layer 12c that will be described later.

The track width defining layer 12a has: a front-end portion that is formed on the write gap layer 9 and functions as the pole portion of the top pole layer 12; and a connecting portion that is formed on the sloped portion of the insulating layer 11 closer to the medium facing surface 20 and is connected to the yoke portion layer 12c. The front-end portion has a width equal to the write track width. The connecting portion has a width greater than that of the front-end portion.

When the track width defining layer 12a is formed, the coupling portion layer 12b made of a magnetic material is formed in the contact hole 9a, and a connecting layer 13 made of a magnetic material is formed on the connecting portion 10a at the same time. The coupling portion layer 12b makes up a portion of the top pole layer 12 that is magnetically coupled to the bottom pole layer 19.

Next, pole trimming is performed. That is, in a region around the track width defining layer 12a, the write gap layer 9 and at least a portion of the pole portion of the bottom pole layer 19 close to the write gap layer 9 are etched using the track width defining layer 12a as a mask. As a result, as shown in FIG. 3, a trim structure is formed, wherein the pole portion of the top pole layer 12, the write gap layer 9 and at least a portion of the pole portion of the bottom pole layer 19 have equal widths. The trim structure prevents an increase in effective track width resulting from an expansion of magnetic flux near the write gap layer 9.

Next, an insulating layer 14 made of an inorganic insulating material such as alumina and having a thickness of 3 to 4 μm, for example, is formed over the entire surface. The insulating layer 14 is then polished by CMP, for example, to reach the surfaces of the track width defining layer 12a, the coupling portion layer 12b and the connecting layer 13, and flattened.

Next, the second layer portion 15 of the thin-film coil made of copper (Cu), for example, and having a thickness of 2 to 3 μm, for example, is formed on the flattened insulating layer 14. In FIG. 2 numeral 15a indicates a connecting portion of the second layer portion 15 connected to the connecting portion 10a of the first layer portion 10 of the thin-film coil through the connecting layer 13. The second layer portion 15 is wound around the coupling portion layer 12b.

Next, an insulating layer 16 having a specific pattern is formed to cover the second layer portion 15 of the thin-film coil and the insulating layer 14 disposed around the second layer portion 15. The insulating layer 16 is made of an organic insulating material that exhibits fluidity when heated, such as photoresist. Next, heat treatment is performed at a specific temperature to flatten the surface of the insulating layer 16. Through this heat treatment, each of the outer and inner edge portions of the insulating layer 16 is made to have a shape of rounded sloped surface.

Next, the yoke portion layer 12c made of a magnetic material for the write head such as Permalloy is formed on the track width defining layer 12a, the insulating layers 14 and 16, and the coupling portion layer 12b. The yoke portion layer 12c makes up the yoke portion of the top pole layer 12. An end of the yoke portion layer 12c closer to the medium facing surface 20 is located apart from the medium facing surface 20. The yoke portion layer 12c is connected to the bottom pole layer 19 through the coupling portion layer 12b.

Next, an overcoat layer 17 made of alumina, for example, is formed to cover the entire surface. Finally, machining of the slider including the foregoing layers is performed to form the medium facing surface 20 of the thin-film magnetic head including the write head and the read head. The thin-film magnetic head is thus completed.

The thin-film magnetic head thus manufactured comprises the medium facing surface 20 that faces toward a recording medium, the read head and the write head. The configuration of the read head will be described in detail later.

The write head incorporates the bottom pole layer 19 and the top pole layer 12 that are magnetically coupled to each other and include the pole portions that are opposed to each other and placed in regions on a side of the medium facing surface 20. The write head further incorporates: the write gap layer 9 provided between the pole portion of the bottom pole layer 19 and the pole portion of the top pole layer 12; and the thin-film coil including the portions 10 and 15 at least part of which is placed between the bottom pole layer 19 and the top pole layer 12 and insulated from the bottom pole layer 19 and the top pole layer 12. In the thin-film magnetic head, as shown in FIG. 2, throat height TH is the length from the medium facing surface 20 to the end of the insulating layer 11 closer to the medium facing surface 20. The throat height is the length (height) from the medium facing surface 20 to the point at which the distance between the two pole layers starts to increase. Although the write head shown in FIG. 2 and FIG. 3 is one designed for a longitudinal magnetic recording system, the write head of the embodiment may be one designed for a perpendicular magnetic recording system.

Figure 1:
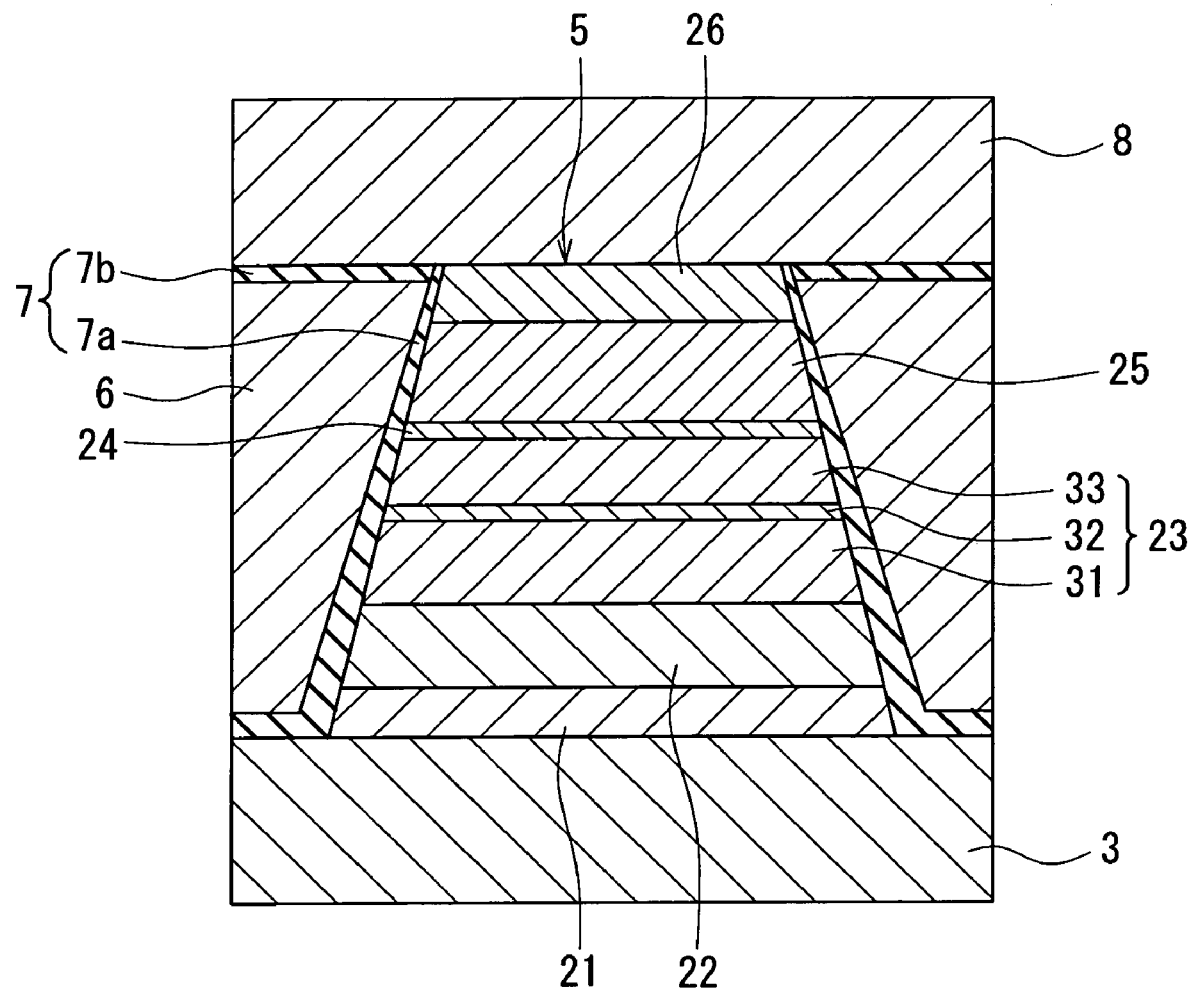
FIG. 1 is a cross-sectional view illustrating a cross section of a read head of an embodiment of the invention parallel to a medium facing surface.

Reference is now made to FIG. 1 to describe the details of the configuration of the read head. FIG. 1 is a cross-sectional view of the read head parallel to the medium facing surface. As shown in FIG. 1, the read head comprises: the first shield layer 3 and the second shield layer 8 disposed with a specific space from each other; and the MR element 5 disposed between the first shield layer 3 and the second shield layer 8. The MR element 5 and the second shield layer 8 are stacked on the first shield layer 3.

The read head further comprises: the two bias field applying layers 6 that are disposed adjacent to the two sides of the MR element 5 and that apply a bias magnetic field to the MR element 5; and the insulating layer 7 disposed around the MR element 5 and the bias field applying layers 6. The bias field applying layers 6 are each made of a hard magnetic layer (hard magnet) or a layered structure made up of ferromagnetic layers and antiferromagnetic layers, for example. To be specific, the bias field applying layers 6 are made of CoPt or CoCrPt, for example. The insulating layer 7 incorporates insulating films 7a and 7b. The insulating film 7a is placed between the bias field applying layers 6 and each of the first shield layer 3 and the MR element 5 and insulates the bias field applying layers 6 from each of the first shield layer 3 and the MR element 5. The insulating film 7b is placed between the second shield layer 8 and the bias field applying layers 6 and insulates the bias field applying layers 6 from the second shield layer 8. The insulating films 7a and 7b are made of alumina, for example.

The MR element 5 is a TMR element utilizing the tunnel magnetoresistive effect. The resistance of the MR element 5 changes in response to an external magnetic field, that is, a signal magnetic field from the recording medium. The first and second shield layers 3 and 8 are used for feeding a sense current to the MR element 5. The sense current is a current for detecting magnetic signals and fed in a direction intersecting the plane of each layer making up the MR element 5, such as the direction perpendicular to the plane of each layer making up the MR element 5. It is possible to obtain the resistance of the MR element 5 from the sense current. It is thereby possible to read data stored on the recording medium through the use of the read head.

FIG. 1 illustrates an example of configuration of the MR element 5. The MR element 5 comprises: a tunnel barrier layer 24 having two surfaces facing toward opposite directions; a free layer 25 disposed adjacent to one of the surfaces of the tunnel barrier layer 24 and having a direction of magnetization that changes in response to a signal magnetic field; and a pinned layer 23 disposed adjacent to the other of the surfaces of the tunnel barrier layer 24 and having a fixed direction of magnetization. In the example shown in FIG. 1, the pinned layer 23 is located closer to the first shield layer 3 than the free layer 25. However, the reverse is possible, that is, the free layer 25 may be located closer to the first shield layer 3. The MR element 5 further comprises: an antiferromagnetic layer 22 disposed on a side of the pinned layer 23 farther from the tunnel barrier layer 24; an underlying layer 21 disposed between the first shield layer 3 and the antiferromagnetic layer 22; and a protection layer 26 disposed between the free layer 25 and the second shield layer 8. In the MR element 5 of FIG. 1, the underlying layer 21, the antiferromagnetic layer 22, the pinned layer 23, the tunnel barrier layer 24, the free layer 25, and the protection layer 26 are stacked one by one on the first shield layer 3.

The antiferromagnetic layer 22 is a layer that fixes the direction of magnetization in the pinned layer 23 by exchange coupling with the pinned layer 23. The underlying layer 21 is provided for improving the crystallinity and orientability of each layer formed thereon and particularly for enhancing the exchange coupling between the antiferromagnetic layer 22 and the pinned layer 23. The protection layer 26 is a layer for protecting the layers therebelow.

The underlying layer 21 has a thickness of 2 to 6 nm, for example. The underlying layer 21 may be made of a layered structure made up of a Ta layer and an Ru layer, for example.

The antiferromagnetic layer 22 has a thickness of 5 to 30 nm, for example, and may be made of an antiferromagnetic material including Mn and at least one element $M_{II}$ selected from the group consisting of Pt, Ru, Rh, Pd, Ni, Cu, Ir, Cr and Fe. The proportion of Mn preferably falls within a range of 35 to 95 atomic % inclusive. The proportion of the other element $M_{II}$ preferably falls within a range of 5 to 65 atomic % inclusive. One type of antiferromagnetic material is a non-heat-induced antiferromagnetic material that exhibits antiferromagnetism without any heat treatment and that induces an exchange coupling magnetic field between a ferromagnetic material and itself. Another type of antiferromagnetic material is a heat-induced antiferromagnetic material that exhibits antiferromagnetism when heat treatment is given. The antiferromagnetic layer 22 may be made of either of these types.

The non-heat-induced antiferromagnetic materials include an Mn alloy that has a γ phase, such as RuRhMn, FeMn, and IrMn. The heat-induced antiferromagnetic materials include an Mn alloy that has a regular crystal structure, such as PtMn, NiMn, and PtRhMn.

As the layer for fixing the direction of magnetization in the pinned layer 23, a hard magnetic layer made of a hard magnetic material such as CoPt may be provided in place of the antiferromagnetic layer 22 as described above. In such a case, the material of the underlying layer 21 is Cr, CrTi or TiW, for example.

The direction of magnetization is fixed in the pinned layer 23 by means of the exchange coupling at the interface between the antiferromagnetic layer 22 and the pinned layer 23. The pinned layer 23 of the embodiment is a so-called synthetic pinned layer that incorporates an outer layer 31, a nonmagnetic middle layer 32 and an inner layer 33 that are stacked in this order on the antiferromagnetic layer 22. Each of the inner layer 33 and the outer layer 31 includes a ferromagnetic layer made of a ferromagnetic material including at least Co selected from the group consisting of Co and Fe. The inner layer 33 and the outer layer 31 are antiferromagnetic-coupled to each other and the directions of magnetization thereof are fixed to opposite directions. The outer layer 31 has a thickness of 3 to 7 nm, for example. The inner layer 33 has a thickness of 3 to 10 nm, for example.

The nonmagnetic middle layer 32 has a thickness of 0.35 to 1.0 nm, for example, and may be made of a nonmagnetic material including at least one element selected from the group consisting of Ru, Rh, Ir, Re, Cr, Zr and Cu. The nonmagnetic middle layer 32 is provided for creating antiferromagnetic exchange coupling between the inner layer 33 and the outer layer 31, and for fixing the magnetizations of these layers to opposite directions. The magnetizations of the inner layer 33 and the outer layer 31 in opposite directions include not only the case in which there is a difference of 180 degrees between these directions of magnetizations, but also the case in which there is a difference of 180±20 degrees between them.

The tunnel barrier layer 24 is a nonmagnetic layer that allows electrons to pass therethrough while the electrons maintain spins by means of the tunnel effect. In the embodiment the tunnel barrier layer 24 is made of a material containing an oxide semiconductor. The oxide semiconductor used for the tunnel barrier layer 24 is preferably zinc oxide (ZnO). The tunnel barrier layer 24 preferably has a thickness that falls within a range of 1 to 3 nm inclusive, more preferably 1 to 2 nm inclusive, and still more preferably 1.3 to 2 nm inclusive. The tunnel barrier layer 24 may be made of a material containing an additive in addition to an oxide semiconductor.

The free layer 25 has a thickness of 2 to 10 nm, for example. The free layer 25 is formed of a ferromagnetic layer having a low coercivity. The free layer 25 may include a plurality of ferromagnetic layers that are stacked.

The protection layer 26 has a thickness of 0.5 to 10 nm, for example. A Ta layer or an Ru layer may be used as the protection layer 26. The protection layer 26 may have a two-layer structure made up of a combination of layers such as a Ta layer and an Ru layer, or a three-layer structure made up of a combination of a Ta layer, an Ru layer and a Ta layer or a combination of an Ru layer, a Ta layer and an Ru layer, for example.

The MR element 5 of the embodiment has a resistance-area product that preferably falls within a range of 0.3 to 2.0 $\Omega\text{-}\mu M^2$ inclusive, and more preferably 0.5 to 1.5 $\Omega\text{-}\mu m^2$ inclusive.

A method of manufacturing the read head of FIG. 1 will now be described. In the method, first, the first shield layer 3 having a specific pattern is formed on the insulating layer 2 by a method such as plating. Next, films to be the layers making up the MR element 5 are formed one by one on the first shield layer 3 by sputtering, for example. Next, these films are patterned by etching to form the MR element 5. Next, the insulating film 7a, the bias field applying layers 6, and the insulating film 7b are formed one by one by sputtering, for example. Next, the second shield layer 8 is formed on the MR element 5 and the insulating film 7b by plating or sputtering, for example.

The operation of the thin-film magnetic head of the embodiment will now be described. The thin-film magnetic head writes data on a recording medium by using the write head and reads data written on the recording medium by using the read head.

In the read head, the direction of the bias magnetic field created by the bias field applying layers 6 intersects the direction orthogonal to the medium facing surface 20 at a right angle. In the MR element 5 the direction of magnetization of the free layer 25 is aligned with the direction of the bias field when no signal magnetic field exists. The direction of magnetization of the pinned layer 23 is fixed to the direction orthogonal to the medium facing surface 20.

In the MR element 5, the direction of magnetization of the free layer 25 changes in response to the signal field sent from the recording medium. The relative angle between the direction of magnetization of the free layer 25 and the direction of magnetization of the pinned layer 23 is thereby changed. As a result, the resistance of the MR element 5 changes. The resistance of the MR element 5 is obtained from the potential difference between the first and second shield layers 3 and 8 when a sense current is fed to the MR element 5 from the shield layers 3 and 8. In such a manner, the data stored on the recording medium is read by the read head.

Since the tunnel barrier layer 24 of the MR element 5 of the embodiment is made of a material containing a oxide semiconductor, a reduction in resistance of the MR element 5 is achieved without making the tunnel barrier layer 24 extremely thin. As a result, according to the embodiment, it is possible to reduce the resistance of the MR element 5 without degradation of characteristics of the MR element 5. As previously described, the resistance-area product of the MR element 5 preferably falls within a range of 0.3 to 2.0 $\Omega\text{-}\mu M^2$ inclusive, and more preferably 0.5 to 1.5 $\Omega\text{-}\mu m^2$ inclusive. In addition, the thickness of the tunnel barrier layer 24 preferably falls within a range of 1 to 3 nm inclusive, more preferably 1 to 2 nm inclusive, and still more preferably 1.3 to 2 nm inclusive. These preferred ranges of the resistance-area product of the MR element 5 and the thickness of the tunnel barrier layer 24 are determined based on the results of first and second experiments described later.

Since the oxide semiconductor forming the tunnel barrier layer 24 is an oxide, the oxide semiconductor has such features that it can be manufactured at low costs, it is stable in an atmosphere, and it is in harmony with an environment better than other compound semiconductors. The oxide semiconductor used for the tunnel barrier layer 24 is preferably zinc oxide (ZnO) that specifically has the above-mentioned features of the oxide semiconductor. Zinc oxide as the oxide semiconductor is an n-type semiconductor having a band gap of approximately 3.4 eV. The oxide semiconductor forming the tunnel barrier layer 24 is not limited to zinc oxide but may be any of titanium oxide, chromium oxide, nickel oxide and vanadium oxide, for example.

The tunnel barrier layer 24 may be made of a material containing an additive in addition to the oxide semiconductor. The function of the additive is to form a donor level in the band structure of the tunnel barrier layer 24 and to thereby increase the carrier density in the tunnel barrier layer 24. As a result, it is possible to control the barrier height by the additive and to thereby control the resistance-area product of the MR element 5. Such an additive may be at least one of $Ga_2O_3$, $In_2O_3$, FeO, CoO, $B_2O_3$, MgO, $Al_2O_3$, GeO, SnO, NiO, $Cr_2O_3$, $V_2O_5$, $TiO_2$, and MnO. If the proportion of the oxide semiconductor contained in the material of the tunnel barrier layer 24 is expressed as 100 weight %, the proportion of the additive contained in the material of the tunnel barrier layer 24 preferably falls within a range of 1 to 5 weight % inclusive.

The first experiment will now be described. In the experiment a plurality of samples were fabricated for each of three types of MR elements including an MR element of a first example of the embodiment, an MR element of a second example of the embodiment, and an MR element of a reference example, and the MR ratio and resistance-area product were obtained for each of these samples (MR elements). The MR elements of the first and second examples correspond to the MR element 5 of the embodiment of the invention. The table 1 below shows the configuration of layers making up the three types of MR elements used in the experiment. The materials of the tunnel barrier layers 24 are different among the three types of MR elements. In addition, in each of the three types of MR elements, the thicknesses of the tunnel barrier layers 24 are different among the plurality of samples.

TABLE 1

| Layer | | Substance | Thickness (nm) |
|---|---|---|---|
| Protection layer | | Ta | 5 |
| | | Ru | 2 |
| Free layer | | NiFe | 5 |
| | | CoFe | 1 |
| Tunnel barrier layer | | | |
| Pinned layer | Inner layer | CoFe | 2 |
| | | CoFeB | 2 |
| | Nonmagnetic middle layer | Ru | 0.8 |
| | Outer layer | CoFe | 5 |
| Antiferromagnetic layer | | IrMn | 5 |
| Underlying layer | | Ru | 2 |
| | | Ta | 1 |

The material of the tunnel barrier layer 24 of the first example is zinc oxide (ZnO) as an oxide semiconductor. The material of the tunnel barrier layer 24 of the second example is zinc oxide (ZnO) as an oxide semiconductor and $Ga_2O_3$ as an additive. In the second example, if the proportion of zinc oxide contained in the material of the tunnel barrier layer 24 is expressed as 100 weight %, the proportion of $Ga_2O_3$ contained in the material of the tunnel barrier layer 24 is 3 weight %. The material of the tunnel barrier layer 24 of the reference example is aluminum oxide.

Each of the samples was fabricated by forming each layer making up the sample by sputtering. The tunnel barrier layer 24 of the first example was formed by direct current sputtering with ZnO as a target. The tunnel barrier layer 24 of the second example was formed by direct current sputtering with a sinter of a mixture of ZnO and $Ga_2O_3$ as a target. The tunnel barrier layer 24 of the reference example was formed by making an Al film by sputtering and then oxidizing the Al film in an oxygen atmosphere. Each of the samples had a shape of a circle of 0.5 μm in diameter when seen from above.

The resistance-area product and the MR ratio of each of the samples were measured by the direct-current four-probe method.

Figure 8:
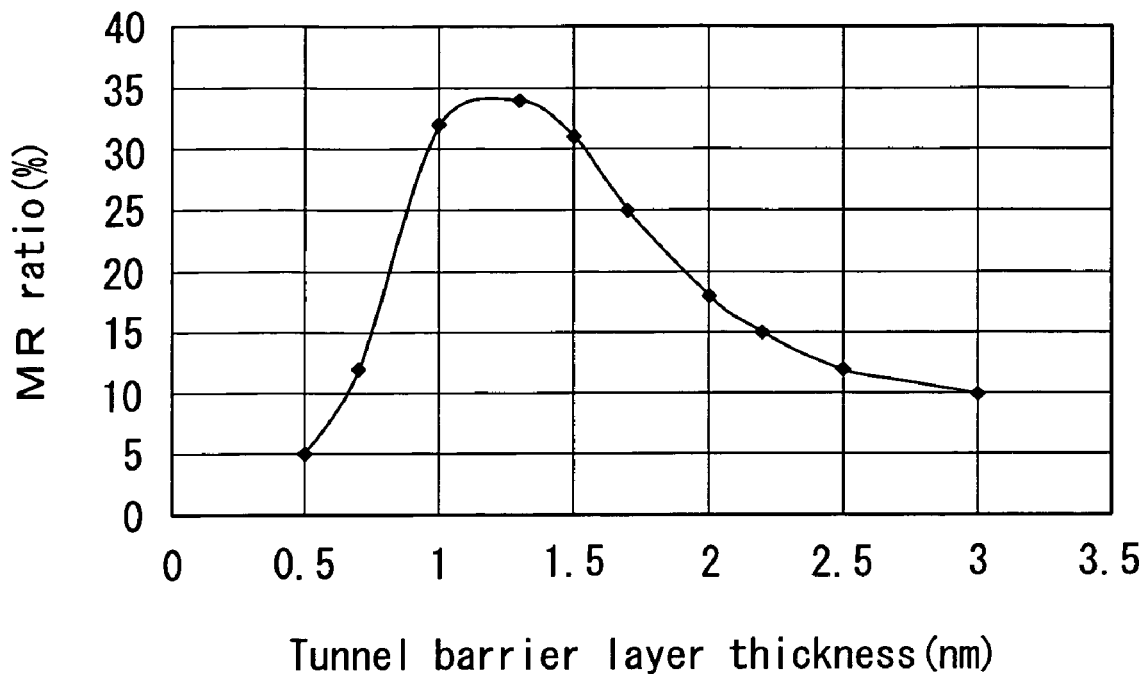
FIG. 8 is a plot showing the relationship between the thickness of a tunnel barrier layer and the MR ratio of an MR element of a first example of the embodiment.
Figure 9:
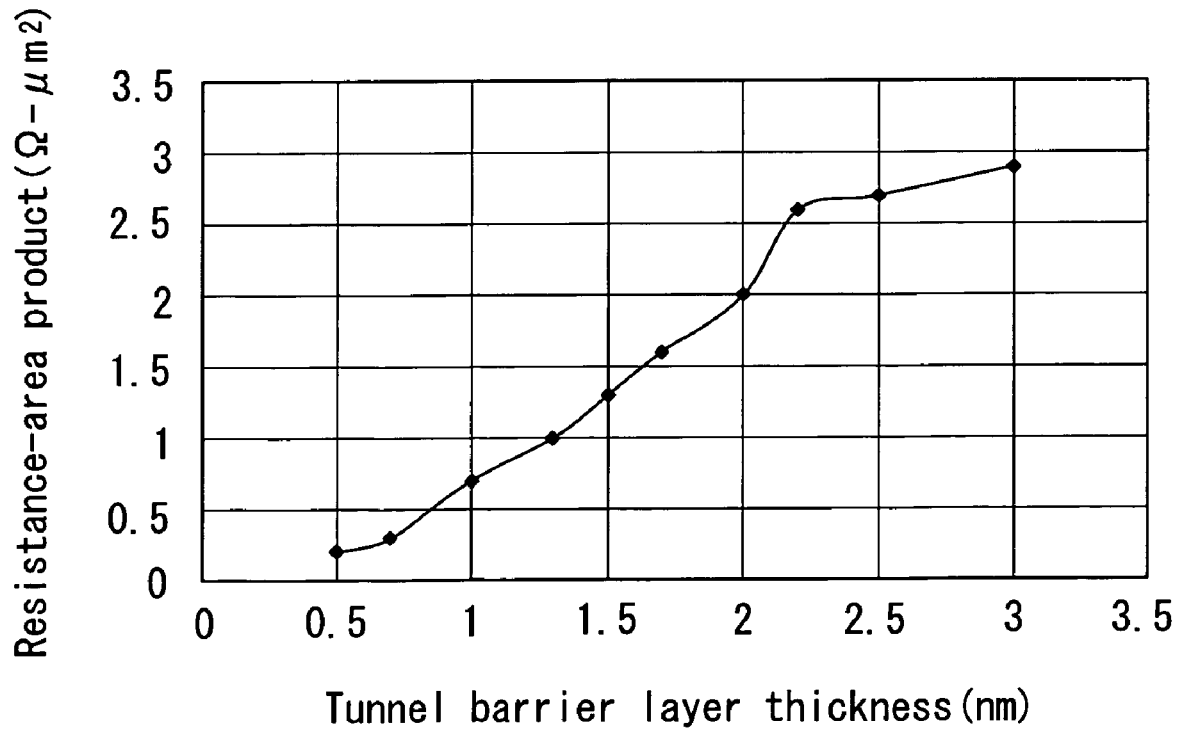
FIG. 9 is a plot showing the relationship between the thickness of the tunnel barrier layer and the resistance-area product of the MR element of the first example of the embodiment.
Figure 10:
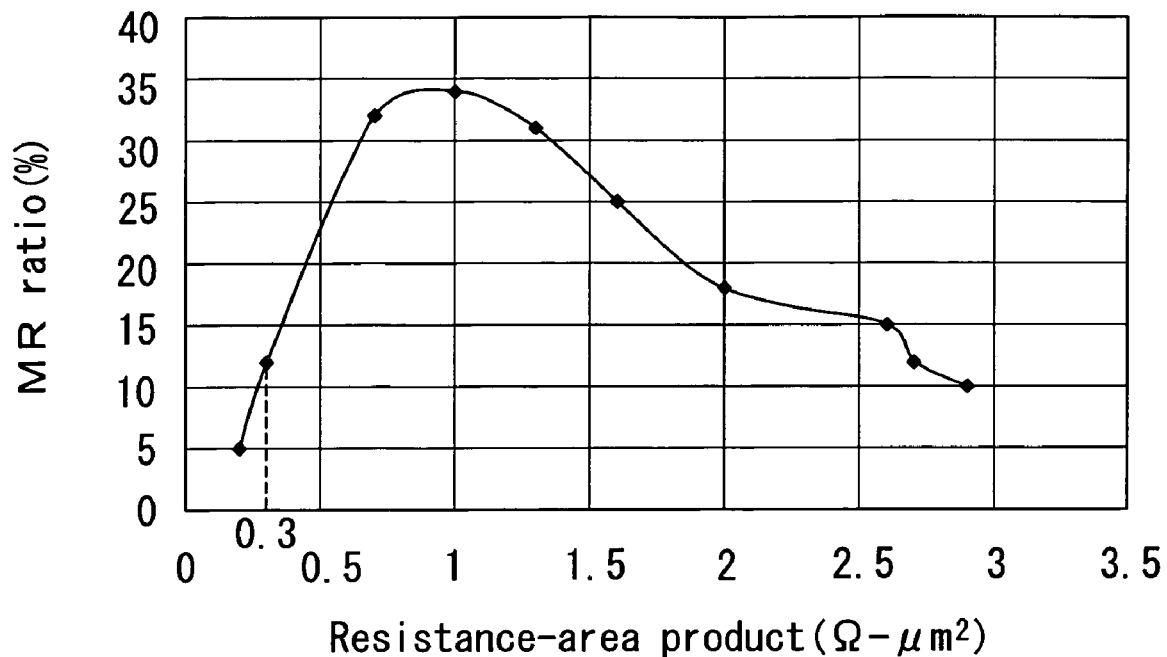
FIG. 10 is a plot showing the relationship between the resistance-area product and the MR ratio of the MR element of the first example of the embodiment.
Figure 11:
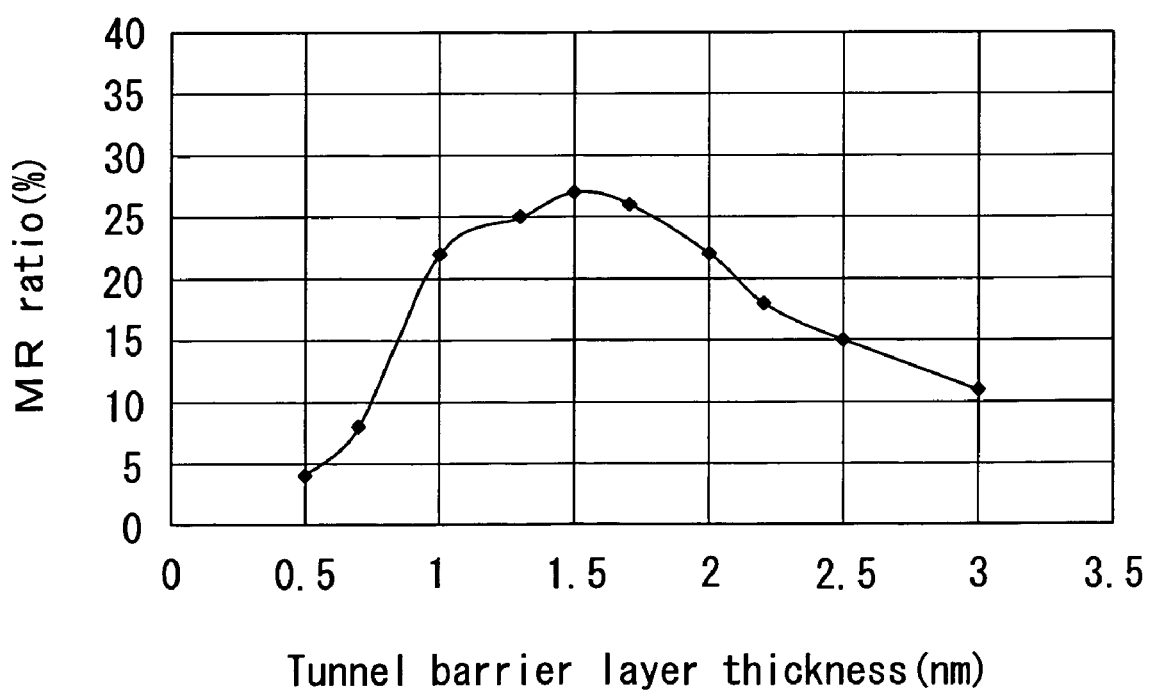
FIG. 11 is a plot showing the relationship between the thickness of a tunnel barrier layer and the MR ratio of an MR element of a second example of the embodiment.
Figure 12:
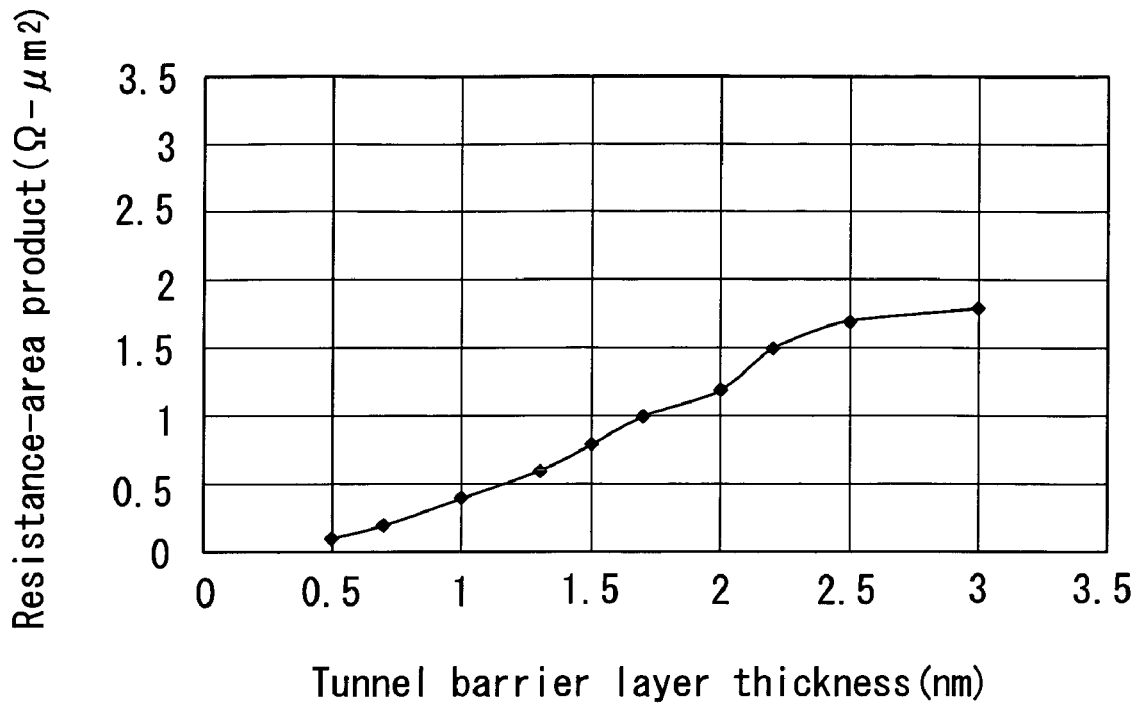
FIG. 12 is a plot showing the relationship between the thickness of the tunnel barrier layer and the resistance-area product of the MR element of the second example of the embodiment.
Figure 13:
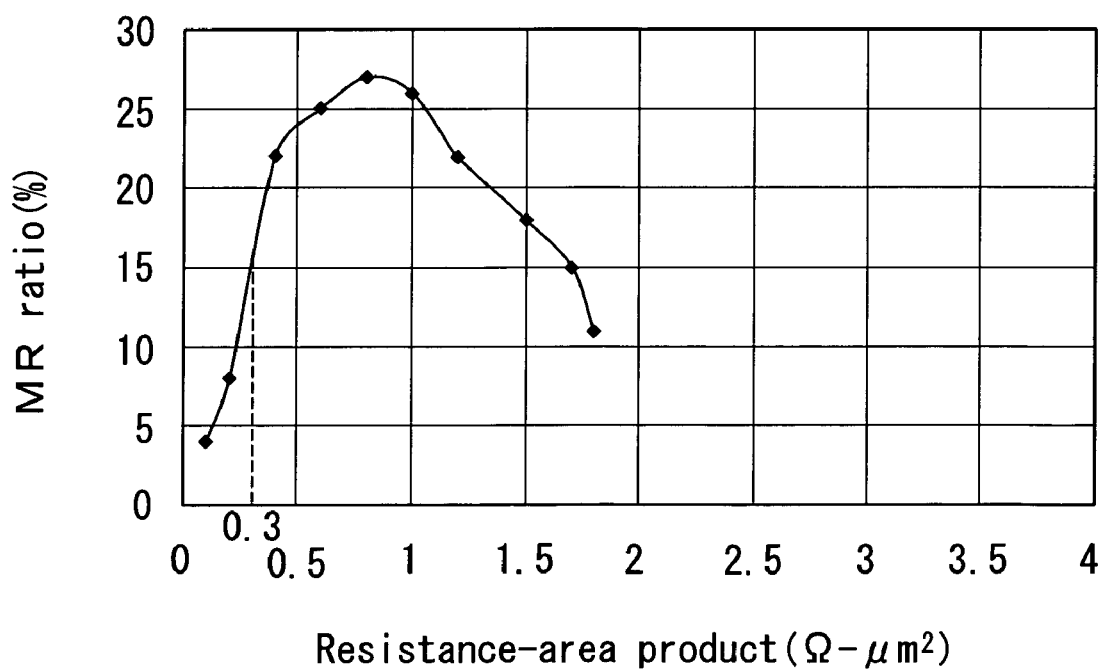
FIG. 13 is a plot showing the relationship between the resistance-area product and the MR ratio of the MR element of the second example of the embodiment.
Figure 14:
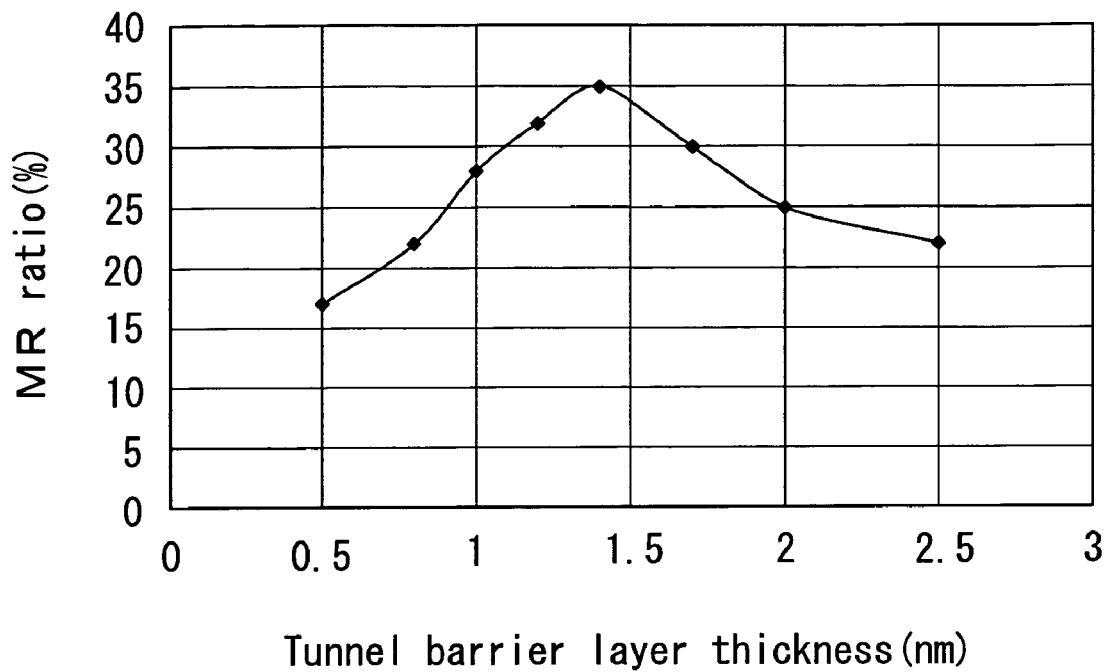
FIG. 14 is a plot showing the relationship between the thickness of a tunnel barrier layer and the MR ratio of an MR element of a reference example.
Figure 15:
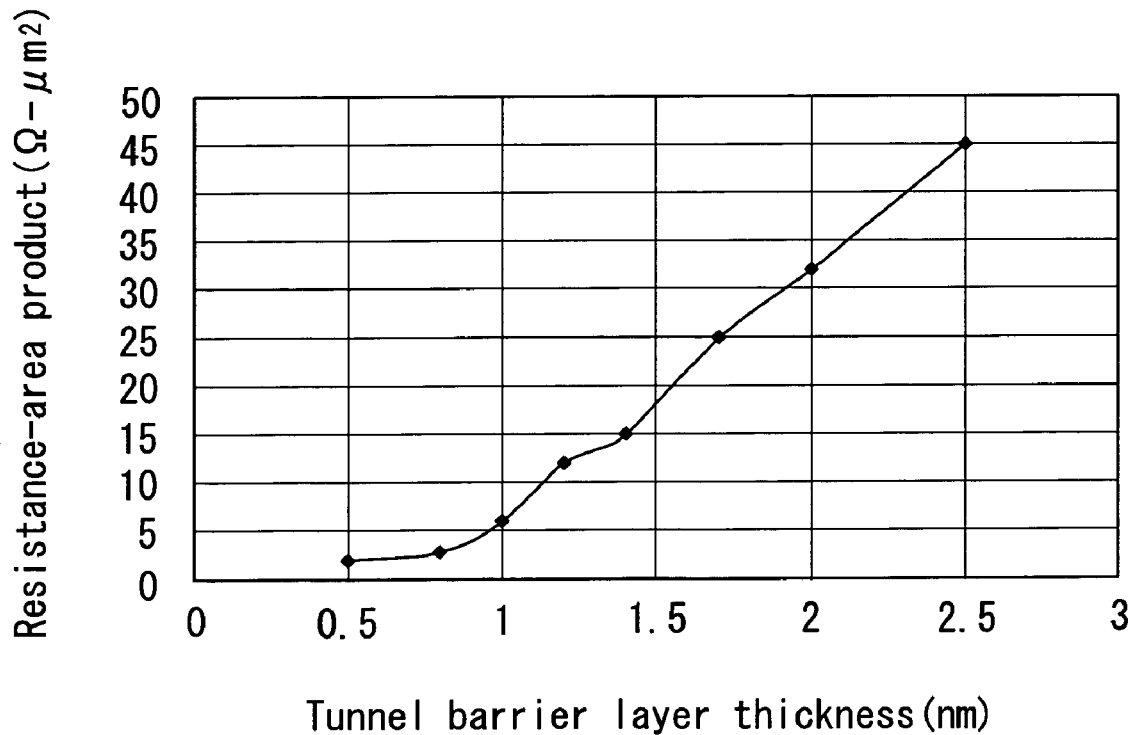
FIG. 15 is a plot showing the relationship between the thickness of the tunnel barrier layer and the resistance-area product of the MR element of the reference example.
Figure 16:
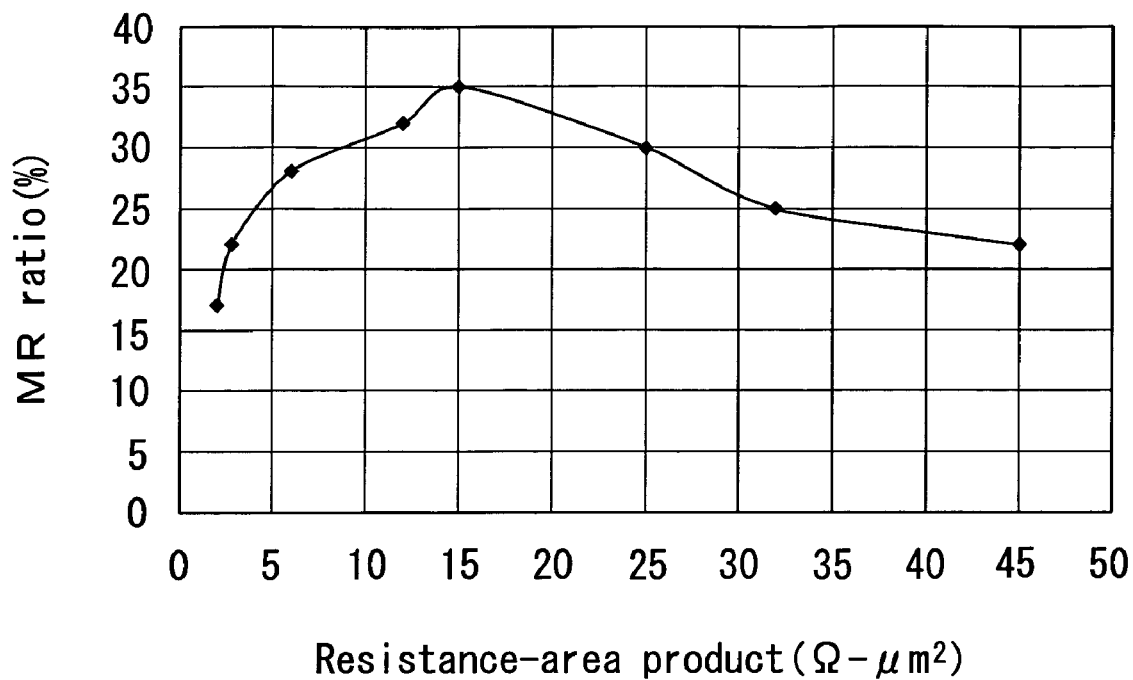
FIG. 16 is a plot showing the relationship between the resistance-area product and the MR ratio of the MR element of the reference example.

Results of the first experiment are shown in the tables 2 to 4 and FIG. 8 to FIG. 16. The table 2 shows the relationship among the thickness of the tunnel barrier layer 24, the MR ratio and the resistance-area product of the first example. The table 3 shows the relationship among the thickness of the tunnel barrier layer 24, the MR ratio and the resistance-area product of the second example. The table 4 shows the relationship among the thickness of the tunnel barrier layer 24, the MR ratio and the resistance-area product of the reference example. FIG. 8 shows the relationship between the thickness of the tunnel barrier layer 24 and the MR ratio of the first example. FIG. 9 shows the relationship between the thickness of the tunnel barrier layer 24 and the resistance-area product of the first example. FIG. 10 shows the relationship between the resistance-area product and the MR ratio of the first example. FIG. 11 shows the relationship between the thickness of the tunnel barrier layer 24 and the MR ratio of the second example. FIG. 12 shows the relationship between the thickness of the tunnel barrier layer 24 and the resistance-area product of the second example. FIG. 13 shows the relationship between the resistance-area product and the MR ratio of the second example. FIG. 14 shows the relationship between the thickness of the tunnel barrier layer 24 and the MR ratio of the reference example. FIG. 15 shows the relationship between the thickness of the tunnel barrier layer 24 and the resistance-area product of the reference example. FIG. 16 shows the relationship between the resistance-area product and the MR ratio of the reference example.

TABLE 2

| Tunnel barrier layer thickness (nm) | MR ratio (%) | Resistance-area product ($\Omega \cdot \mu m^2$) |
|---|---|---|
| 0.5 | 5 | 0.2 |
| 0.7 | 12 | 0.3 |
| 1.0 | 32 | 0.7 |
| 1.3 | 34 | 1.0 |
| 1.5 | 31 | 1.3 |
| 1.7 | 25 | 1.6 |
| 2.0 | 18 | 2.0 |
| 2.2 | 15 | 2.6 |
| 2.5 | 12 | 2.7 |
| 3.0 | 10 | 2.9 |

TABLE 3

| Tunnel barrier layer thickness (nm) | MR ratio (%) | Resistance-area product ($\Omega \cdot \mu m^2$) |
|---|---|---|
| 0.5 | 4 | 0.1 |
| 0.7 | 8 | 0.2 |
| 1.0 | 22 | 0.4 |
| 1.3 | 25 | 0.6 |
| 1.5 | 27 | 0.8 |
| 1.7 | 26 | 1.0 |
| 2.0 | 22 | 1.2 |
| 2.2 | 18 | 1.5 |
| 2.5 | 15 | 1.7 |
| 3.0 | 11 | 1.8 |

TABLE 4

| Tunnel barrier layer thickness (nm) | MR ratio (%) | Resistance-area product (Ω·μm²) |
|---|---|---|
| 0.5 | 17 | 2 |
| 0.8 | 22 | 2.8 |
| 1.0 | 28 | 6 |
| 1.2 | 32 | 12 |
| 1.4 | 35 | 15 |
| 1.7 | 30 | 25 |
| 2.0 | 25 | 32 |
| 2.5 | 22 | 45 |

As the comparison among FIG. 9, FIG. 12 and FIG. 15 indicates, the resistance-area product of each of the first and second examples of the embodiment is much lower than that of the reference example even though the thicknesses of the tunnel barrier layers 24 are the same. As shown in FIG. 10 and FIG. 13, in the first and second examples, the MR ratio extremely decreases if the resistance-area product is smaller than 0.3 Ω-μm². Considering this, it is preferred that the resistance-area product of the MR element 5 of the embodiment be 0.3 Ω-μm² or greater. In the first and second examples, it is required that the thickness of the tunnel barrier layer 24 be smaller than 1 nm in order to make the resistance-area product smaller than 0.3 Ω-μm². However, if the thickness of the tunnel barrier layer 24 is made smaller than 1 nm in the first example, head noise increases, according to the result of the second experiment that will be described later. This also supports that the resistance-area product of the MR element 5 of the embodiment should preferably be 0.3 Ω-μm² or greater.

On the other hand, the resistance of the MR element 5 increases as the resistance-area product thereof increases. An increase in resistance of the MR element 5 is not preferred since high frequency response of the read head is degraded. Table 5 shows the relationship between the resistance-area product of the MR element and the resistance of the MR element obtained by calculation for each of three types of MR elements having first to third sizes. The shapes of the top surfaces of the MR elements of the first to third sizes are rectangles but the sizes of the top surfaces are different. Here, in each of the MR elements, a dimension of the top surface taken along the direction of track width is called a width while a dimension of the top surface taken along the direction orthogonal to the medium facing surface is called a length. In the MR element of the first size, the width of the top surface is 80 nm and the length thereof is 100 nm. In the MR element of the second size, the width of the top surface is 60 nm and the length thereof is 80 nm. In the MR element of the third size, the width of the top surface is 40 nm and the length thereof is 60 nm.

TABLE 5

| Resistance-area product (Ω-μm²) | Resistance of MR element of first size (Ω) | Resistance of MR element of second size (Ω) | Resistance of MR element of third size (Ω) |
|---|---|---|---|
| 1.0 | 125 | 208 | 417 |
| 1.2 | 150 | 250 | 500 |
| 1.5 | 188 | 313 | 625 |
| 1.7 | 213 | 354 | 708 |
| 2.0 | 250 | 417 | 833 |
| 2.2 | 275 | 458 | 917 |
| 2.5 | 313 | 521 | 1042 |
| 3.0 | 375 | 625 | 1250 |

To meet the demand for reducing the track width, the MR element of the second size is more preferable than the MR element of the first size, and the MR element of the third size is more preferable than the MR element of the second size. However, the resistance of the MR element increases as the track width is reduced. In addition, as previously described, the resistance of the MR element increases as the resistance-area product of the MR element increases. To reduce the track width, it is preferred that the upper limit of the resistance-area product of the MR element 5 of the embodiment be about 2.0 Ω-μm². Furthermore, as can be seen from FIG. 10, it is unfavorable that the resistance-area product of the MR element 5 of the first example of the embodiment be greater than 2.0 Ω-μm² since this would result in a reduction in MR ratio. These findings teach that it is preferred that the resistance-area product of the MR element 5 of the embodiment be 2.0 Ω-μm² or smaller. Consequently, the resistance-area product of the MR element 5 of the embodiment preferably falls within a range of 0.3 to 2.0 Ω-μm² inclusive.

The second experiment will now be described. In the experiment the relationship between the thickness of the tunnel barrier layer 24 and head noise was obtained for each of a read head incorporating the MR element of the first example of the embodiment and a read head incorporating the MR element of the reference example. The head noise means noise produced by the read head when a sense current is fed to the MR element while the read head is not opposed to a recording medium. This noise is chiefly shot noise. In the second experiment head noise is expressed in effective values. In the second experiment head noise was determined based on the integral area of a spectrum of noise in a frequency range of 0 to 200 MHz measured by a spectrum analyzer.

Figure 17:
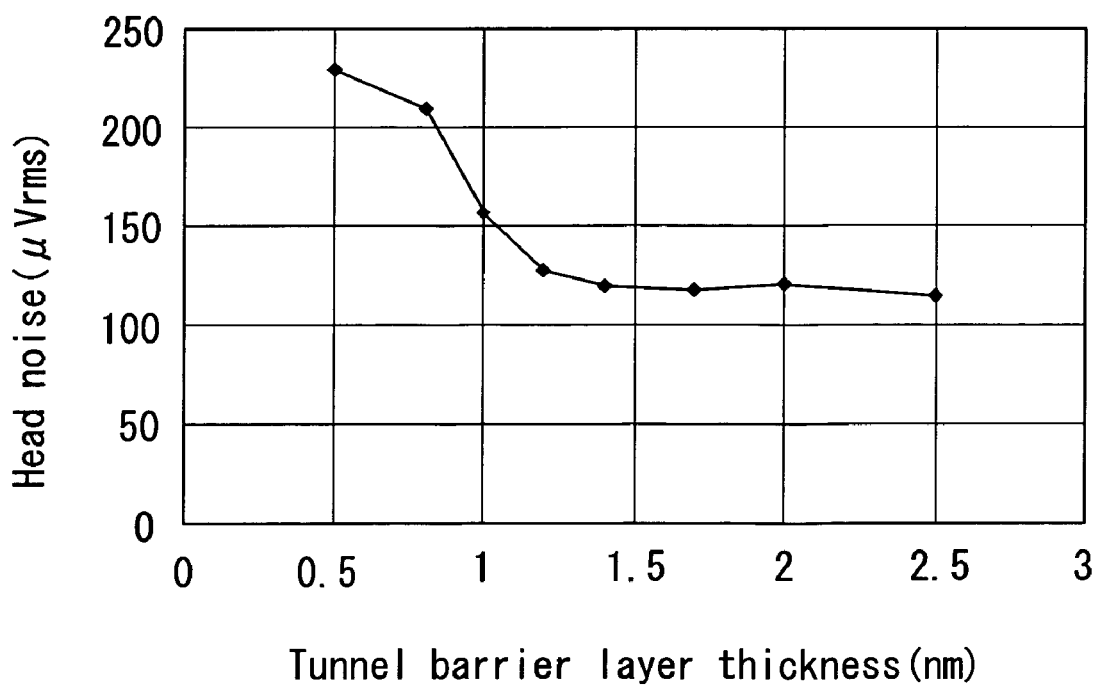
FIG. 17 is a plot showing the relationship between the thickness of the tunnel barrier layer of the MR element of the reference example and head noise.
Figure 18:
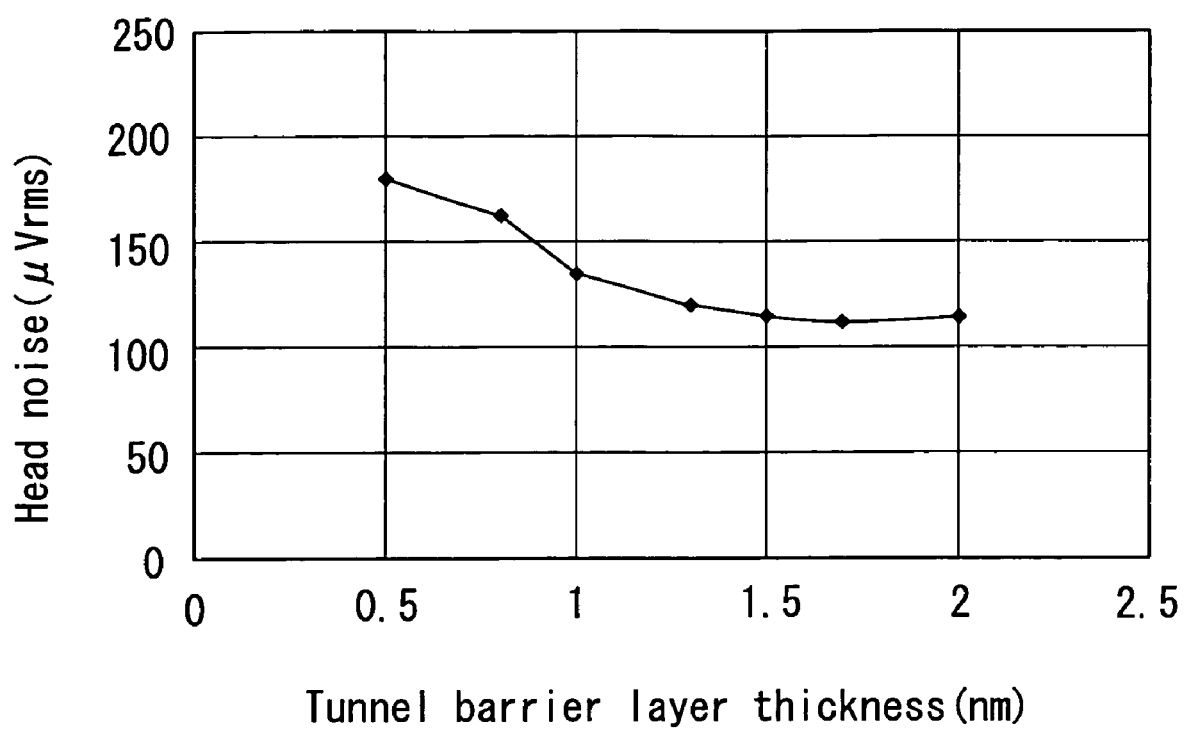
FIG. 18 is a plot showing the relationship between the thickness of the tunnel barrier layer of the MR element of the first example of the embodiment and head noise.

Results of the second experiment are shown in the tables 6 and 7 and FIG. 17 and FIG. 18. The table 6 and FIG. 17 each show the relationship between the thickness of the tunnel barrier layer 24 of the reference example and head noise. The table 7 and FIG. 18 each show the relationship between the thickness of the tunnel barrier layer 24 of the first example of the embodiment and head noise.

TABLE 6

| Tunnel barrier layer thickness (nm) | Head noise (μVrms) | MR ratio (%) | Resistance-area product (Ω-μm²) |
|---|---|---|---|
| 0.5 | 229 | 17 | 2 |
| 0.8 | 210 | 22 | 2.8 |
| 1.0 | 157 | 28 | 6 |
| 1.2 | 128 | 32 | 12 |
| 1.4 | 120 | 35 | 15 |
| 1.7 | 118 | 30 | 25 |
| 2.0 | 121 | 25 | 32 |
| 2.5 | 115 | 22 | 45 |

TABLE 7

| Tunnel barrier layer thickness (nm) | Head noise (μVrms) | MR ratio (%) | Resistance-area product (Ω-μm²) |
|---|---|---|---|
| 0.5 | 180 | 5 | 0.2 |
| 0.8 | 162 | 12 | 0.3 |
| 1.0 | 135 | 32 | 0.7 |
| 1.3 | 120 | 34 | 1.0 |
| 1.5 | 115 | 31 | 1.3 |
| 1.7 | 112 | 25 | 1.6 |
| 2.0 | 114 | 18 | 2.0 |

For each of the reference example and the first example of the embodiment, when the thickness of the tunnel barrier layer 24 falls within a range of 1 nm and smaller, head noise increases as the thickness of the tunnel barrier layer 24 decreases. The reason for this is considered to be that magnetic coupling is created between the free layer 25 and the pinned layer 23 if the thickness of the tunnel barrier layer 24 decreases.

When the thickness of the tunnel barrier layer 24 falls within a range of 1 nm and smaller, head noise is greater for the reference example than for the first example of the embodiment. A possible cause of this is considered to be the following. Since the tunnel barrier layer 24 of the reference example is formed by oxidizing the Al film in an oxygen atmosphere, it is likely that pinholes that would cause metallic conduction are formed in the tunnel barrier layer 24. This would cause the head noise to be greater for the reference example when the thickness of the tunnel barrier layer 24 falls within a range of 1 nm and smaller. In contrast, since the tunnel barrier layer 24 of the first example of the embodiment is formed by sputtering with ZnO as a target and no oxidation is performed, fewer pinholes are formed as compared with the reference example. This would cause the head noise to be smaller for the first example of the embodiment than for the reference example when the thickness of the tunnel barrier layer 24 falls within a range of 1 nm and smaller.

As can be seen from the table 4 and FIG. 14, in the reference example, it is required that the thickness of the tunnel barrier layer 24 be made extremely small in order to reduce the resistance-area product of the MR element. For example, to allow the resistance-area product of the MR element to be 6 $\Omega\text{-}\mu m^2$ or smaller in the reference example, it is required that the thickness of the tunnel barrier layer 24 be 1 nm or smaller. However, as shown in FIG. 17, if the thickness of the tunnel barrier layer 24 is made 1 nm or smaller in the reference example, head noise increases and therefore it is impossible to implement a read head having excellent characteristics. For a read head it is preferred that head noise be not greater than around 150 µVrms.

On the other hand, as can be seen from the results of the first experiment, it is possible in the first example of the embodiment to make the resistance-area product of the MR element sufficiently small without extremely reducing the thickness of the tunnel barrier layer 24 as in the reference example. In the first example it is possible to make head noise 150 µVrms or smaller as long as the thickness of the tunnel barrier layer 24 is 1 nm or greater. Considering this, it is preferred that the thickness of the tunnel barrier layer 24 of the embodiment be 1 nm or greater.

For the first and second examples of the embodiment, it is estimated from FIG. 8, FIG. 9, FIG. 11 and FIG. 12 that, if the thickness of the tunnel barrier layer 24 exceeds 3 nm, the MR ratio of the MR element would decrease while the resistance-area product of the MR element would increase as the thickness of the tunnel barrier layer 24 increases. Therefore, it is preferred that the thickness of the tunnel barrier layer 24 of the embodiment be 3 nm or smaller. Consequently, the thickness of the tunnel barrier layer 24 of the embodiment preferably falls within a range of 1 to 3 nm inclusive.

As shown in FIG. 8 and FIG. 11, in the first and second examples, the MR ratio of the MR element is particularly great when the thickness of the tunnel barrier layer 24 falls within a range of 1 to 2 nm inclusive. Therefore, it is more preferred that the thickness of the tunnel barrier layer 24 of the embodiment fall within a range of 1 to 2 nm inclusive so as to make the MR ratio of the MR element greater.

As shown in FIG. 18, for the first example, head noise noticeably increases when the thickness of the tunnel barrier layer 24 is smaller than 1.3 nm. As shown in FIG. 8, FIG. 9, FIG. 11 and FIG. 12, in the first and second examples, the MR ratio of the MR element noticeably decreases while the resistance-area product of the MR element noticeably increases when the thickness of the tunnel barrier layer 24 is greater than 2 nm. These findings teach that it is still more preferred that the thickness of the tunnel barrier layer 24 of the embodiment fall within a range of 1.3 to 2 nm inclusive.

As shown in FIG. 9, in the first example, if the resistance-area product of the MR element is 0.5 $\Omega\text{-}\mu m^2$ or greater, it is possible without fail that the thickness of the tunnel barrier layer 24 is made 1 nm or greater and that head noise is made 150 µVrms or smaller. This teaches that it is more preferred that the resistance-area product of the MR element 5 of the embodiment be 0.5 $\Omega\text{-}\mu m^2$ or greater. As shown in FIG. 10 and FIG. 13, in the first and second examples, the MR ratio of the MR element noticeably decreases if the resistance-area product of the MR element is greater than 1.5 $\Omega\text{-}\mu m^2$. This suggests that it is more preferred that the resistance-area product of the MR element 5 of the embodiment be 1.5 $\Omega\text{-}\mu m^2$ or smaller. These findings teach that it is more preferred that the resistance-area product of the MR element 5 of the embodiment fall within a range of 0.5 to 1.5 $\Omega\text{-}\mu m^2$ inclusive.

Figure 4:
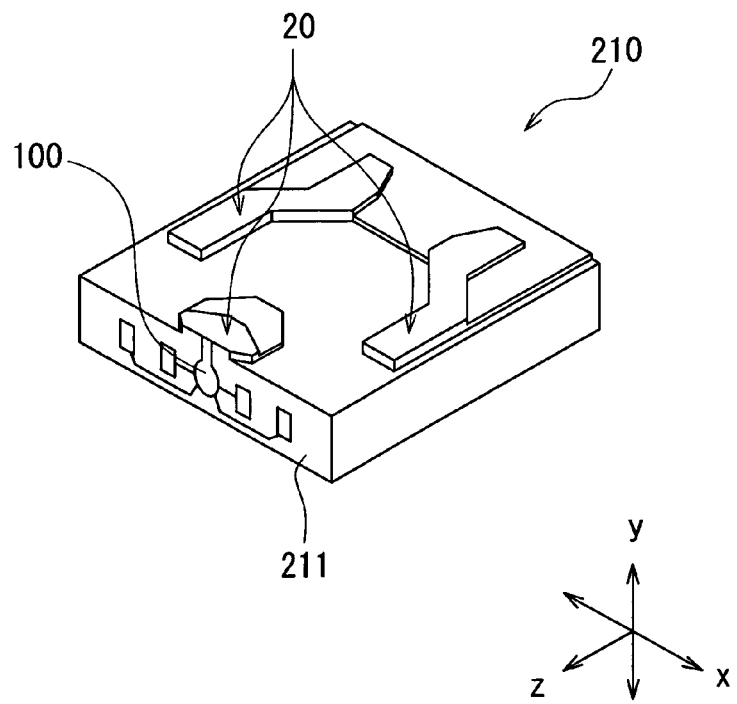
FIG. 4 is a perspective view illustrating a slider that a head gimbal assembly of the embodiment of the invention includes.

A head gimbal assembly, a head arm assembly and a magnetic disk drive of the embodiment will now be described. Reference is made to FIG. 4 to describe a slider 210 incorporated in the head gimbal assembly. In the magnetic disk drive the slider 210 is placed to face toward a magnetic disk platter that is a circular-plate-shaped recording medium to be driven to rotate. The slider 210 has a base body 211 made up mainly of the substrate 1 and the overcoat layer 17 of FIG. 2. The base body 211 is nearly hexahedron-shaped. One of the six surfaces of the base body 211 faces toward the magnetic disk platter. The medium facing surface 20 is formed in this one of the surfaces. When the magnetic disk platter rotates in the z direction of FIG. 4, an airflow passes between the magnetic disk platter and the slider 210, and a lift is thereby generated below the slider 210 in the y direction of FIG. 4 and exerted on the slider 210. The slider 210 flies over the magnetic disk platter by means of the lift. The x direction of FIG. 4 is across the tracks of the magnetic disk platter. The thin-film magnetic head 100 of the embodiment is formed near the air-outflow-side end (the end located at the lower left of FIG. 4) of the slider 210.

Figure 5:
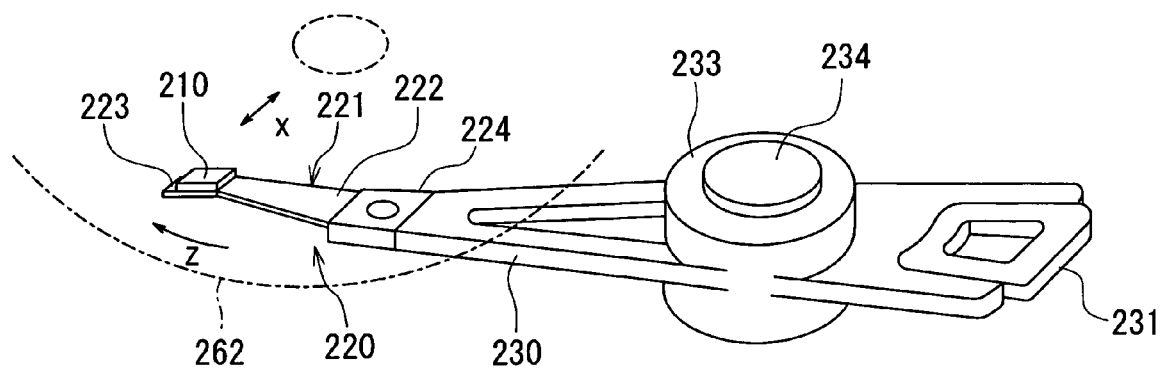
FIG. 5 is a perspective view illustrating a head arm assembly of the embodiment of the invention.

Reference is now made to FIG. 5 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly comprising the arm 230 and the head gimbal assembly 220 attached to the arm 230 is called a head arm assembly. An assembly comprising a carriage having a plurality of arms wherein the head gimbal assembly 220 is attached to each of the arms is called a head stack assembly.

FIG. 5 illustrates the head arm assembly of the embodiment. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 6:
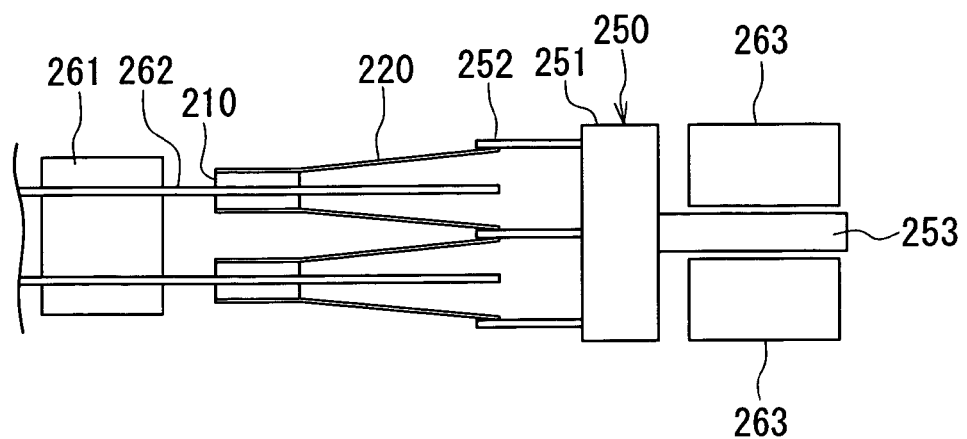
FIG. 6 is a view for illustrating a main part of a magnetic disk drive of the embodiment of the invention.
Figure 7:
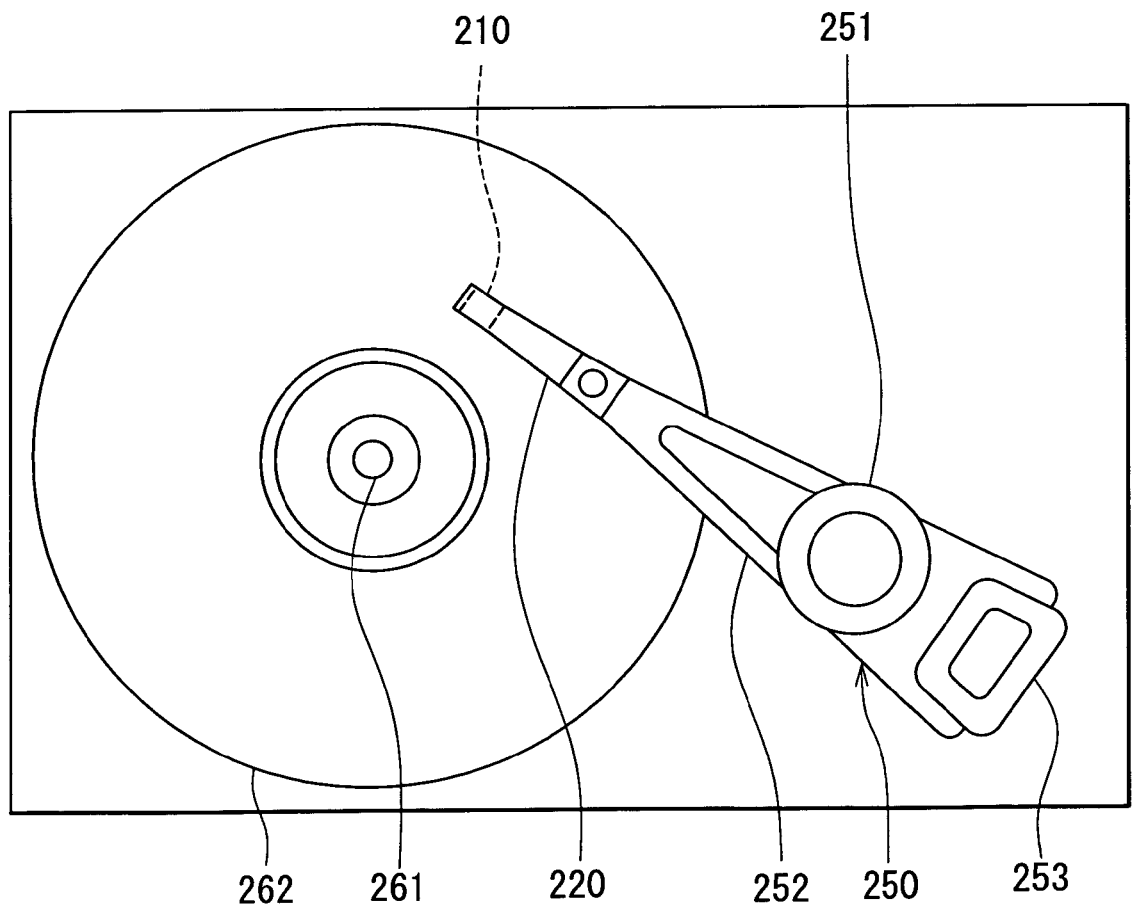
FIG. 7 is a top view of the magnetic disk drive of the embodiment of the invention.

Reference is now made to FIG. 6 and FIG. 7 to describe an example of the head stack assembly and the magnetic disk drive of the embodiment. FIG. 6 illustrates the main part of the magnetic disk drive. FIG. 7 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention and support the sliders 210 and align them with respect to the magnetic disk platters 262.

In the magnetic disk drive of the embodiment the actuator moves the slider 210 across the tracks of the magnetic disk platter 262 and aligns the slider 210 with respect to the magnetic disk platter 262. The magnetic head incorporated in the slider 210 writes data on the magnetic disk platter 262 through the use of the write head and reads data stored on the magnetic disk platter 262 through the use of the read head.

The head gimbal assembly, the head arm assembly and the magnetic disk drive of the embodiment exhibit effects similar to those of the foregoing thin-film magnetic head of the embodiment.

The present invention is not limited to the foregoing embodiment but may be practiced in still other ways. For example, while the magnetic head disclosed in the embodiment has such a configuration that the read head is formed on the base body and the write head is stacked on the read head, it is also possible that the read head is stacked on the write head.

If the thin-film magnetic head is dedicated to writing, the thin-film magnetic head may have a configuration comprising a read head only.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
    a medium facing surface that faces toward a recording medium; and
    a magnetoresistive element for detecting a signal magnetic field sent from the recording medium, the magnetoresistive element incorporating:
        a tunnel barrier layer having two surfaces facing toward opposite directions;
        a free layer disposed adjacent to one of the surfaces of the tunnel barrier layer and having a direction of magnetization that changes in response to the signal magnetic field; and
        a pinned layer disposed adjacent to the other of the surfaces of the tunnel barrier layer and having a fixed direction of magnetization, wherein:
            the tunnel barrier layer is made of a material containing zinc oxide;
            the tunnel barrier layer has a thickness that falls within a range of 1.3 to 2 nm inclusive; and
            the magnetoresistive element has a resistance-area product that falls within a range of 0.3 to 2.0 $\Omega\text{-}\mu m^2$ inclusive.

2. The thin-film magnetic head according to claim 1, wherein the resistance-area product of the magnetoresistive element falls within a range of 0.5 to 1.5 $\Omega\text{-}\mu m^2$ inclusive.

3. The thin-film magnetic head according to claim 1, wherein the tunnel barrier layer is made of a material containing an additive in addition to zinc oxide.

4. A head gimbal assembly comprising: a slider including a thin-film magnetic head and disposed to face toward a recording medium; and a suspension flexibly supporting the slider, wherein:
    the thin-film magnetic head comprises: a medium facing surface that faces toward the recording medium; and a magnetoresistive element for detecting a signal magnetic field sent from the recording medium, the magnetoresistive element incorporating:
        a tunnel barrier layer having two surfaces facing toward opposite directions;
        a free layer disposed adjacent to one of the surfaces of the tunnel barrier layer and having a direction of magnetization that changes in response to the signal magnetic field; and
        a pinned layer disposed adjacent to the other of the surfaces of the tunnel barrier layer and having a fixed direction of magnetization, wherein:
            the tunnel barrier layer is made of a material containing zinc oxide;
            the tunnel barrier layer has a thickness that falls within a range of 1.3 to 2 nm inclusive; and
            the magnetoresistive element has a resistance-area product that falls within a range of 0.3 to 2.0 $\Omega\text{-}\mu m^2$ inclusive.

5. A head arm assembly comprising: a slider including a thin-film magnetic head and disposed to face toward a recording medium; a suspension flexibly supporting the slider; and an arm for making the slider travel across tracks of the recording medium, the suspension being attached to the arm, wherein:
    the thin-film magnetic head comprises: a medium facing surface that faces toward the recording medium; and a magnetoresistive element for detecting a signal magnetic field sent from the recording medium, the magnetoresistive element incorporating:
        a tunnel barrier layer having two surfaces facing toward opposite directions;
        a free layer disposed adjacent to one of the surfaces of the tunnel barrier layer and having a direction of magnetization that changes in response to the signal magnetic field; and
        a pinned layer disposed adjacent to the other of the surfaces of the tunnel barrier layer and having a fixed direction of magnetization, wherein:

the tunnel barrier layer is made of a material containing zinc oxide;

the tunnel barrier layer has a thickness that falls within a range of 1.3 to 2 nm inclusive; and the magnetoresistive element has a resistance-area product that falls within a range of 0.3 to 2.0 $\Omega\text{-}\mu m^2$ inclusive.

6. A magnetic disk drive comprising: a slider including a thin-film magnetic head and disposed to face toward a recording medium that is driven to rotate; and an alignment device supporting the slider and aligning the slider with respect to the recording medium, wherein:

the thin-film magnetic head comprises: a medium facing surface that faces toward the recording medium; and a magnetoresistive element for detecting a signal magnetic field sent from the recording medium, the magnetoresistive element incorporating:

a tunnel barrier layer having two surfaces facing toward opposite directions;

a free layer disposed adjacent to one of the surfaces of the tunnel barrier layer and having a direction of magnetization that changes in response to the signal magnetic field; and a pinned layer disposed adjacent to the other of the surfaces of the tunnel barrier layer and having a fixed direction of magnetization, wherein:

the tunnel barrier layer is made of a material containing zinc oxide;

the tunnel barrier layer has a thickness that falls within a range of 1.3 to 2 nm inclusive; and the magnetoresistive element has a resistance-area product that falls within a range of 0.3 to 2.0 $\Omega\text{-}\mu m^2$ inclusive.

* * * * *